United States Patent [19]

Mann et al.

[11] Patent Number: 4,715,746

[45] Date of Patent: Dec. 29, 1987

[54] METHOD OF STRENGTHENING GEOLOGICAL FORMATIONS

[75] Inventors: Max Mann, Odenthal; Manfred Kapps, Bergisch-Gladbach, both of Fed. Rep. of Germany

[73] Assignees: Bergwerksverband GmbH, Essen; Bayer Aktiengesellschaft, Leverkusen, both of Fed. Rep. of Germany

[21] Appl. No.: 38,375

[22] Filed: Apr. 15, 1987

Related U.S. Application Data

[63] Continuation of Ser. No. 819,075, Jan. 15, 1986, abandoned.

[30] Foreign Application Priority Data

Jan. 30, 1985 [DE] Fed. Rep. of Germany ....... 3502997

[51] Int. Cl.$^4$ .................................................. E02D 3/12
[52] U.S. Cl. .................. 405/264; 252/8.551; 528/49; 528/76; 523/130; 523/131; 521/117; 405/263; 405/258
[58] Field of Search .............. 405/128, 129, 263, 264; 528/49, 76, 77; 523/130, 131; 521/117; 166/295, 293; 210/751

[56] References Cited

U.S. PATENT DOCUMENTS

| Re 31,946 | 7/1985 | Meyer et al. | 405/264 |
|---|---|---|---|
| 3,798,186 | 3/1974 | Nakade et al. | 260/2.5 |
| 4,097,587 | 6/1978 | Soma et al. | 260/45.8 |
| 4,114,382 | 9/1978 | Kubens et al. | 405/264 |
| 4,329,442 | 5/1982 | Pokorny | 528/49 |
| 4,365,670 | 12/1982 | McLaughlin | 528/75 |
| 4,440,901 | 4/1984 | Reiff et al. | 528/49 |
| 4,454,252 | 6/1984 | Meyer | 521/905 |
| 4,475,847 | 10/1984 | Cornely et al. | 405/264 |
| 4,497,663 | 2/1985 | Fisher et al. | 405/53 |

FOREIGN PATENT DOCUMENTS

| 0093392 | 11/1983 | European Pat. Off. . |
|---|---|---|
| 1758185 | 10/1970 | Fed. Rep. of Germany . |
| 1784458 | 10/1971 | Fed. Rep. of Germany . |
| 885762 | 12/1961 | United Kingdom . |

OTHER PUBLICATIONS

Journals "Gluckauf", 1968, pp. 666–670.
Journals "Gluckauf", 1977, pp. 707–711.
Heane Berghau, 1977, pp. 124–129.

Primary Examiner—Dennis L. Taylor
Attorney, Agent, or Firm—Gene Harsh; Joseph C. Gil; Thomas W. Roy

[57] ABSTRACT

The present invention relates to a method of strengthening geological formations in underground workings or mines by introducing reaction mixtures containing a polyisocyanate component (a), a polyol component (b) and optionally auxiliary agents and additives (c) into the formation which is required to be strengthened and reacting the mixtures to form polyurethanes, wherein polyol component (b) contains mixtures of (i) organic polyhydroxyl compounds having a hydroxyl number of about 100 to 800 and (ii) monovalent alcohols having a molecular weight of 32 to about 600, component (ii) being present in an amount of about 0.01 to 20% by weight, based on the total quantity of component (b).

8 Claims, No Drawings

METHOD OF STRENGTHENING GEOLOGICAL FORMATIONS

This application is a continuation, of application Ser. No. 819,075 filed Jan. 15, 1986, abandoned.

BACKGROUND OF THE INVENTION

1. Field of the Invention

The present invention relates to a method of strengthening geological formations in underground workings or mines, particularly in coal mines, by means of reaction mixtures based on organic polyisocyanates and polyhydroxyl compounds which react to form polyurethanes, in which special monofunctional alcohols are used as additives to regulate the foaming process.

2. Description of the Prior Art

The strengthening of geological formations underground, particularly in coal mining, by means of foamable polyurethanes which harden in the formation is already known (see e.g. the Journals Gluckauf (1968), pages 666 to 670, Gluckauf (1977), pages 707 to 711 and Bergbau (1977), pages 124 to 129, and DE-PS Nos. 1,129,894, 1,758,185, 1,784,458, 2,436,029, 2,623,464 or 3,139,395). Such mixtures which react to produce polyurethanes are also used to seal off structures against water and/or gases.

This state of the art process is generally carried out as follows: the two reaction components, the polyisocyanate and polyalcohol (polyhydroxyl component), are transported separately to a bore hole where they are continuously combined in a static mixer and forced through the bore hole into the rock formation where they foam up and harden.

The polyhydroxyl compounds used in this state of the art process are preferably based on mixtures of polyether polyols and castor oil (see e.g. Gluckauf (1968), pages 666 to 670). Fatty acid derivatives containing hydroxyl groups, in particular castor oil, increase tackiness and strength of adherence as well as flexibility of the PU mixtures. At the same time, these polyols function as defoamers, thereby, suppressing excessive foaming up of the polyurethane resins which would weaken the mechanical strength properties. The castor oil is normally used in quantities of about 1 to 50% by weight, preferably about 5 to 20% by weight, based on the polyol mixture. It therefore constitutes a considerable cost factor, especially since the price of this natural product is subject to wide fluctuations and is on the whole considerably higher than that of other polyols. In addition, being a naturally occurring product, castor oil fluctuates widely in quality. Therefore, there was a need for a better solution which would be free from these disadvantages, while preserving the advantageous effects mentioned above.

It has now surprisingly been found that by using small quantities of monofunctional alcohols, it is possible not only to avoid the disadvantages described above but also to improve the properties of the polyurethane in use.

SUMMARY OF THE INVENTION

The present invention relates to a method of strengthening geological formations in underground workings or mines by introducing reaction mixtures containing a polyisocyanate component (a), a polyol component (b), and optionally auxiliary agents and additives (c) into the formation which is required to be strengthened and reacting the mixtures to form polyurethanes, wherein polyol component (b) contains mixtures of (i) organic polyhydroxyl compounds having a hydroxyl number of about 100 to 800 and (ii) mono-valent alcohols having a molecular weight of 32 to about 600, component (ii) being present in an amount of about 0.01 to 20% by weight, based on the total quantity of component (b).

DETAILED DESCRIPTION OF THE INVENTION

The polyisocyanate component (a) used in the method according to the invention is preferably based on polyphenylene-polymethylene polyisocyanates such as those obtainable by aniline/formaldehyde condensation followed by phosgenation ("polymeric MDI") or derivatives of these polyisocyanates which contain carbodiimide, biuret, urethane and/or allophanate groups and are liquid at room temperature. Polyisocyanate mixtures which are liquid at room temperature and have been obtained by the phosgenation of aniline/formaldehyde condensates ("polymeric MDI") and their liquid, isocyanate-containing reaction products with subequivalent quantities (NCO/OH molar ratio = 1:0.005 to 1:0.3) of polyvalent alcohols within the molecular weight range of 62 to about 3,000, in particular polyols within the molecular weight range of about 106 to 3,000 and containing ether groups are preferred. Mixtures of 2,4'- and 4,4'-diisocyanatodiphenyl methane which are liquid at room temperature are also suitable for use as polyisocyanate component (a). In principle, other organic polyisocyanates could also be used according to the invention, e.g. those disclosed in DE-OS No. 2,832,253, pages 10 and 11. Polyisocyanate mixtures of the diphenyl methane series having a viscosity at 25° C. of about 50 to 500 mPa.s and an isocyanate content of about 30 to 32% by weight are particularly preferred.

Polyol component (b) is based on mixtures of (i) organic polyhydroxyl compounds having an OH number of about 100 to 800, preferably about 250 to 400, and (ii) monovalent alcohols.

The polyhydroxyl compounds (i) are preferably polyether polyols or mixtures of such polyether polyols known from polyurethane chemistry. When mixtures of various polyhydroxyl compounds are used, the particulars given above concerning the hydroxyl number apply to the mixture as a whole. This means that individual components of a mixture may have hydroxyl numbers outside the given range. Suitable polyether polyols are, for example, the propoxylation products of 2- to 8-valent starter molecules such as, for example, water, 1,2-dihydroxy propane, trimethylol propane, pentaerythritol, glycerol, sorbitol, ethylene diamine and optionally cane sugar. Component (i) generally has an average hydroxyl functionality of about 2.0 to 5.0, preferably about 2.0 to 3. Suitable mixtures of this kind may be obtained, for example, by subjecting mixtures of starter molecules of the type mentioned above as examples to a propoxylation reaction. Alternatively, polyhydroxy polyethers which have been prepared separately may subsequently be mixed together to form component (i) according to the invention.

Component (ii) is based on monovalent alcohols having a molecular weight range of 32 to about 600, preferably about 60 to 150, containing a primary, secondary or tertiary hydroxyl group. Component (ii) may also be based on mixtures of various monovalent alcohols. With mixtures, the particulars given concerning the molecular weights are based on the statistical average values.

Examples of suitable monovalent alcohols include methanol, ethanol, n-propanol, isopropanol, n-butanol, isobutanol, t-butanol, n-pentanol, 1-methyl-1-hydroxybutane, n-hexanol, 2-methyl-1-hydroxypentane, 2-ethyl-1-hydroxy-hexane, n-dodecanol, n-octadecanol, commercial fatty alcohols or mixtures thereof containing up to about 40 carbon atoms, cyclohexanol and benzyl alcohol. t-Butanol and i-butanol are particularly preferred. Any mixtures of such monovalent alcohols may, of course, be used. Component (b) contains the monovalent alcohols (ii) in a quantity of about 0.01 to 20% by weight, preferably about 0.1 to 5% by weight, based on the total weight of component (b).

The following are examples of suitable auxiliary agents and additives (c) which may optionally be used:

(c1) Water, which may be added in a quantity of up to about 5% by weight, preferably up to about 4% by weight, based on the weight of component (b).

(c2) Catalysts for the isocyanate addition reaction, in particular organic tin compounds such as tin(II) octoate or dibutyl tin dilaurate or tertiary amines such as N,N-dimethyl benzylamine or triethylene diamine. These catalysts are generally used in a quantity of up to about 2% by weight, preferably about 0.3 to 1% by weight, based on the total quantity of mixture.

(c3) Organic blowing agents such as trichloromonofluoromethane, dichlorodifluoromethane or methylene chloride.

(c4) Foam regulators such as the polyether polysiloxanes known for this purpose.

Other auxiliary agents and additives which may be used include flame retarders (e.g. phosphoric acid derivatives), and organic or inorganic fillers (e.g. urea, calcium carbonate, mica or talcum).

In the reaction mixtures used in the method according to the invention, the individual components are present in such quantities that they correspond to an isocyanate index of about 90 to 150, preferably about 120 to 140. By "isocyanate index" is meant the quotient of the number of isocyanate groups in the reaction mixture divided by the number of isocyanate reactive groups present in the reaction mixture, multiplied by 100, water counting as a difunctional compound.

Any auxiliary agents and additives (c) used are generally mixed with polyol component (b) before the process according to the invention is carried out and the reaction mixture is then prepared as a 2-component mixture. This means that the reaction mixture is prepared by vigorously mixing polyisocyanate component (a) with polyol component (b) or with the mixture of polyol component (b) and auxiliary agents and additives (c). Mixing apparatus known in the art may be used for this purpose.

The process according to the invention is carried out by the known methods of the state of the art, that is to say, numerous holes about 2 to 6 m in depth and about 20 to 60 mm in diameter are drilled into the formations which are to be strengthened, and the mixtures according to the invention are introduced into these holes. The bore holes are generally sealed by a plug having an opening through which the reaction mixture can be injected by way of a pipe, a non-return valve in the opening preventing the reaction mixture from flowing out of the bore hole after injection has been completed. The injection may be carried out at pressures of up to about 100 bar or more, but excessively high pressures may cause coal or rock to break away.

The process according to the invention could in principle also be carried out by the method disclosed in U.S. Pat. No. 3,698,196, in which polyisocyanate component (a) on the one hand and polyol component (b) and, if used, auxiliary agent and additive (c) on the other are introduced into the chambers of a 2-chamber cartridge, the components conforming to the requirements for isocyanate index indicated above, and the cartridge is then introduced into the previously prepared bore hole and mechanically destroyed inside the bore hole so that the two components are mixed together. After the cartridge has been destroyed, the bore hole is sealed. This method, however, is less advantageous than the first procedure described.

When the bore holes have been sealed and the liquid resin introduced, the hardenable mixture, which is preferably a foamable mixture, penetrates the geological formation under its own foaming pressure and at the same time completely fills the bore holes. The resulting polyurethanes, in particular polyurethane foams, permanently strengthen the geological formation by virtue of their excellent adherence to the coal or rock and their excellent mechanical properties.

As a result of using the monovalent alcohols (ii), which is an essential feature of the invention, the carbon dioxide initially formed in the reaction does not contribute to the formation of the resulting foam but escapes, that is to say it "boils off", in some cases after an initial foaming up and subsequent collapse of the foam while still in the liquid phase. It is only in the final phase of the reaction that the (in most cases desired) foaming up and formation of the final, preferably coarse foam structure takes place. If the process were carried out without the additives which are essential for the invention, foaming up would already take place during the initial phase of the reaction, which would result in the formation of foam structures with an uneven density distribution and with considerable regions of the foam having insufficient density and, therefore, inferior mechanical properties. Such undesirable variation in the density of the foam does not occur in the above mentioned foaming up during the later phase of the reaction, and consequently the foams obtained are invariably homogeneous in density and, therefore, also homogeneous in their mechanical properties. The monovalent alcohols which are essential to this invention are substantially more effective in this respect than castor oil which was previously used for the same purpose. The use of monovalent alcohols according to the invention generally also has the advantage that the viscosity of polyol component (b) used for the process is lower than that of a similar polyol component not containing monovalent alcohols. As a result, the reaction mixture is more easily able to penetrate even small cracks in the formation which is required to be strengthened.

The following examples serve to further illustrate the process according to the invention. All percentages given are percentages by weight.

EXAMPLES

The following starting components were used in the examples:

Polyether polyol I—prepared from a mixture of saccharose and propane-1,2-diol in a molar ratio of 1:5 and propylene oxide having an OH number of 380 and a viscosity of 580 mPa.s at 25° C.

Polyether polyol II—prepared from glycerol and propylene oxide with an OH number of 380 and a viscosity of 450 mPa.s at 25° C.

Polyether polyol III—prepared from propane-1,2-diol and propylene oxide with an OH number of 110 and a viscosity of 105 mPa.s at 25° C.

Polyether polyol IV—prepared from propane-1,2-diol and propylene oxide with an OH number of 284 and a viscosity of 75 mPa.s at 25° C.

Castor oil I—first pressing, iodine number 87.2, OH number 158, water content 0.14% and viscosity at 25° C. of 678 mPa.s.

Castor oil II—first pressing, iodine number 88.5, OH number 149, water content 0.21% and viscosity at 25° C. of 670 mPa.s.

Polymeric MDI—an isocyanate obtained by the phosgenation of a aniline/formaldehyde condensate, consisting to an extent of about 60% of diisocyanatodiphenyl methane and having an isocyanate content of 31% by weight and a viscosity at 25° C. of 140 mPa.s.

EXAMPLE 1

(Comparison Example)

100 g of polyol mixture having the composition indicated below and 120 g of polymeric MDI were vigorously stirred together by hand in an unwaxed cardboard cup for 60 seconds, using a flat wooden rod for stirring. The mixture was then poured into a vertically suspended tubular foil of polyamide (circumference 134 mm) which was closed at the bottom. The height to which the liquid reaction mixture filled the tube before any gas evolved was set equal to 1 and served as reference for the expansion which was to be determined. The expansion is expressed as a multiple of the filling height and is referred to as the "foaming factor." An increase in volume by 100% is therefore defined as a foaming factor of 2.0. Polyol mixture:

| Polyether polyol I | 70.7 g |
| Polyether polyol IV | 28.3 g |
| Water | 1.0 g |
| Foaming factor | 2.9 |

The foam floated upwards and clearly separated from a less strongly foamed phase below it (abrupt change in gross density). It has been found in practice that such effects indicate insufficient strength in the upper region, due to insufficient mass. Formulations which give this result fail in use below ground.

EXAMPLE 2

(state of the art)

Polyol mixture:

| Polyether polyol I | 63.9 g |
| Polyether polyol IV | 25.5 g |
| Castor oil I | 9.6 g |
| Water | 1.0 g |
| Foaming factor | 1.9 |

The material was uniformly blown up by bubbles. No abrupt change in gross density was observed. Reaction compounds of this kind have proved suitable for use below ground for many years.

EXAMPLE 3

(according to the invention)

Process as described in Example 1.
Polyol mixture:

| Polyether polyol I | 68.3 g |
| Polyether polyol IV | 27.3 g |
| i-amylalcohol | 3.4 g |
| Water | 1.0 g |
| Foaming factor | 2.0 |

The reaction product had the same appearance as that described in Example 2.

EXAMPLE 4

(according to the invention)

Process as described in Example 1.
Polyol mixture:

| Polyether polyol I | 68.3 g |
| Polyether polyol III | 16.5 g |
| Polyether polyol IV | 10.8 g |
| i-amylalcohol | 3.4 g |
| Water | 1.0 g |
| Foaming factor | 2.1 |

The reaction product had the same appearance as that described in Example 2.

EXAMPLE 5

(according to the invention)

Process as described in Example 1.
Polyol mixture:

| Polyether polyol I | 70.2 g |
| Polyether polyol IV | 28.1 g |
| secondary butanol | 0.7 g |
| Water | 1.0 g |
| Foaming factor | 1.7 |

The reaction product had the same appearance as that described in Example 2.

EXAMPLE 6

(according to the invention)

Process as described in Example 1.
Polyol mixture:

| Polyether polyol I | 70.2 g |
| Polyether polyol IV | 28.1 g |
| tertiary butanol | 0.7 g |
| Water | 1.0 g |
| Foaming factor | 1.8 |

The reaction product had the same appearance as that described in Example 2.

EXAMPLE 7

(comparison)

The procedure was similar to that described in Example 1, but the stirring time was only 30 seconds instead of 60 seconds.
Polyol mixture:

| Polyether polyol II | 71.0 g |
|---|---|
| Polyether polyol IV | 28.4 g |
| Dibutyl tin dilaurate (DBTL) | 0.3 g |
| Water | 0.3 g |
| Foaming factor | 2.5 |

The reaction product showed an abrupt change in gross density as described in Example 1.

EXAMPLE 8

(state of the art)

Process as described in Example 7.
Polyol mixture:

| Polyether polyol II | 64.2 g |
|---|---|
| Polyether polyol IV | 25.6 g |
| Castor Oil | 9.6 g |
| DBTL | 0.3 g |
| Water | 0.3 g |
| Foaming factor | 1.6 |

The product was uniform in appearance and similar to that described in Example 2.

EXAMPLE 9

(according to the invention)

Process as described in Example 7.
Polyol mixture:

| Polyether polyol II | 70.5 g |
|---|---|
| Polyether polyol IV | 28.2 g |
| mixture of saturated and unsaturated fatty alcohols (Alfol) of C14 to C22 | 0.7 g |
| DBTL | 0.3 g |
| Water | 0.3 g |
| Foaming factor | 1.4 |

The product was uniform in appearance and similar to that described in Example 2.

EXAMPLE 10

(according to the invention)

Process as described in Example 7.
Polyol mixture:

| Polyether polyol I | 34.3 g |
|---|---|
| Polyether polyol II | 34.3 g |
| Polyether polyol IV | 27.4 g |
| 2-ethyl-1-hexanol | 3.4 g |
| DBTL | 0.3 g |
| Water | 0.3 g |
| Foaming factor | 1.4 |

The product was uniform in appearance and similar to that described in Example 2.

EXAMPLE 11

(according to the invention)

Process as described in Example 7.
Polyol mixture:

| Polyether polyol I | 70.5 g |
|---|---|
| Polyether polyol IV | 28.2 g |
| benzyl alcohol | 0.7 g |
| DBTL | 0.3 g |
| Water | 0.3 g |
| Foaming factor | 1.7 |

The product was uniform in appearance and similar to that described in Example 2.

EXAMPLE 12

(according to the invention)

Process as described in Example 7.
Polyol mixture:

| Polyether polyol I | 70.5 g |
|---|---|
| Polyether polyol IV | 28.2 g |
| isopropanol | 0.7 g |
| DBTL | 0.3 g |
| Water | 0.3 g |
| Foaming factor | 1.5 |

The product was very uniform in appearance and similar to that described in Example 2.

EXAMPLE 13

(according to the invention)

Process as described in Example 7.
Polyol mixture:

| Polyether polyol II | 70.5 g |
|---|---|
| Polyether polyol IV | 28.2 g |
| 1,1-dimethyl-allyl alcohol | 0.7 g |
| DBTL | 0.3 g |
| Water | 0.3 g |
| Foaming factor | 1.5 |

The product was uniform in appearance and similar to that described in Example 2.

EXAMPLE 14

(according to the invention)

Process as described in Example 7.
Polyol mixture:

| Polyether polyol I | 70.5 g |
|---|---|
| Polyether polyol IV | 28.2 g |
| tertiary butanol | 0.7 g |
| DBTL | 0.3 g |
| Water | 0.3 g |
| Foaming factor | 1.5 |

The product was uniform in appearance and similar to that described in Example 2.

EXAMPLE 15

(according to the invention)

Process as described in Examaple 7.
Polyol mixture:

| Polyether polyol I | 70.5 g |
|---|---|
| Polyether polyol IV | 28.2 g |
| methanol | 0.7 g |
| DBTL | 0.3 g |
| Water | 0.3 g |

-continued

| Foaming factor | 1.4 |

The product was uniform in appearance and similar to that described in Example 2.

EXAMPLE 16

In a sloping longwall 220 meters in length with a height of cut coal face of 1.70 meters supported by a 4-prop shield support, coal repeatedly slid off in two regions 10 to 18 m in length, with the result that the roof collapsed in areas of up to 7 m in length and 4 m in height.

To strengthen the coal face, a total of 7 bore holes 4.5 m in length (diameter 45 mm) were drilled into the face at intervals of 5 m at a height of about 1.30 m and 6 other bore holes were drilled analogously into the roof in staggered formation to the first set at a slope of about 20 gon. A reaction mixture according to Example 6 was injected into these bore holes by means of the usual pressure injection equipment (two component pump, static mixing units, bore hole seal). The amount of resin taken up was about 73 kg in the coal and 53 kg in the roof. Collapses no longer occurred in the injected areas.

EXAMPLE 17

A sloping longwall 240 m in length with a height of cut coal face of 1.60 m and a slope of 15 gon (centesimal degree) with a drift band in the lower region of from 30 to 60 cm, equipped with 4-prop shield supports, passed through several disturbance zones which constantly led to roof collapses of up to 15 m in length and 8 m in height. Some of these zones had wet patches, and water was found to leak from the foot of the longwall at the rate of 60 liters per minute.

In three successive night shifts, 9 holes 4.5 m in length (diameter 45 mm) were drilled into the coal face in region A (shield 80 to 120) at intervals of 5 m at a height of about 1.40 m, and 8 holes 4.50 m in length were drilled into the roof at slopes of about 15 gon. The bore holes were fitted with injection equipment and a reaction mixture according to Example 7 was forced in by means of a 2-component pump with static mixer. The amount of resin taken up was on average 92 kg in the coal and 68 kg in the roof.

Region B was also injected (shield 121 to 160), using a reaction mixture according to Example 8. The bore holes took up an average of 89 kg of resin in the coal and 58 kg in the roof.

During the following three night shifts, region A was strengthened as previously region B had been strengthened, while region B was strengthened with a reaction mixture according to Example 14. The average uptake of resin per bore hole fell slightly, to 88 kg in the coal and 65 kg in the roof (region A) and 87 kg in the coal and 57 kg in the roof (region B).

In the next three nights, region A was again strengthened as previously region B had been, and conversely. The uptake of resin per bore hole was 87 kg in the coal and 68 kg in the roof for region A and 86 kg in the coal and 59 kg in the roof for region B.

During the first three days, isolated collapses of up to 2 m in height occurred in moist areas in region A which had been strengthened according to Example 7 and highly foamed, relatively brittle resin could be found in the collapsed areas. In the regions which had been injected according to Example 8, a total of 7 collapses with a maximum height of 1 m occurred during the nine days. Highly foamed, brittle resin was again observed. Where the reinforcement had been carried out according to Example 14, only small collapses 3 m in length and with a maximum height of 1 m were observed during the six days of working.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for strengthening a geological formation in an underground working or mine by introducing a reaction mixture which contains only organic foam-forming components and optionally water comprising
   (a) a polyisocyanate component and
   (b) a polyol component which comprises a mixture of
      (i) an organic polyhydroxyl compound with a hydroxyl number of about 100 to 800 and
      (ii) a monovalent alcohol having a molecular weight of about 32 to 600 wherein component (ii) is present in an amount of about 0.01 to 20% by weight, based on the total quantity of component (b)
   into at least one bore-hole located in said formation and allowing components (a) and (b) to react to form a polyurethane.

2. The process of claim 1 wherein said monovalent alcohol comprises t-butanol or i-butanol.

3. The process of claim 1 wherein component (ii) is present in an amount of about 0.1 to 5% by weight, based on the weight of component (b).

4. The process of claim 2 wherein component (ii) is present in an amount of 0.1 to 5% by weight, based on the weight of component (b).

5. The process of claim 1 wherein said polyisocyanate component comprises a polyphenylenepolymethylene polyisocyanate obtained by the phosgenation of an aniline/formaldehye condensation product.

6. The process of claim 2 wherein said polyisocyanate component comprises a polyphenylenepolymethylene polyisocyanate obtained by the phosgenation of an aniline/formaldehyde condensation product.

7. The process of claim 3 wherein said polyisocyanate component comprises a polyphenylenepolymethylene polyisocyanate obtained by the phosgenation of an aniline/formaldehyde condensation product.

8. The process of claim 4 wherein said polyisocyanate component comprises a polyphenylenepolymethylene polyisocyanate obtained by the phosgenation of an aniline/formaldehyde condensation product.

* * * * *